United States Patent
Huffman

(10) Patent No.: US 6,694,261 B1
(45) Date of Patent: Feb. 17, 2004

(54) METHOD FOR IDENTIFICATION OF SHALLOW WATER FLOW HAZARDS USING MARINE SEISMIC DATA

(75) Inventor: Alan Royce Huffman, The Woodlands, TX (US)

(73) Assignee: Conoco Inc., Ponca City, OK (US)

(*) Notice: Subject to any disclaimer, the term of this patent is extended or adjusted under 35 U.S.C. 154(b) by 0 days.

(21) Appl. No.: 09/433,446

(22) Filed: Nov. 4, 1999

Related U.S. Application Data

(60) Provisional application No. 60/137,849, filed on Jun. 7, 1999.

(51) Int. Cl.[7] ............................................. G06F 19/00
(52) U.S. Cl. ............................................. 702/1; 703/5
(58) Field of Search ......................... 702/1, 14; 367/73, 367/115, 131, 75, 152; 703/5

(56) References Cited

U.S. PATENT DOCUMENTS

| | | | | |
|---|---|---|---|---|
| 4,858,201 A | * | 8/1989 | Goins et al. .................. | 367/75 |
| 4,942,557 A | | 7/1990 | Seriff .......................... | 367/15 |
| 4,967,401 A | * | 10/1990 | Barney et al. ................ | 367/46 |
| 4,972,384 A | * | 11/1990 | Williams ...................... | 367/75 |
| 5,081,612 A | * | 1/1992 | Scott et al. ................... | 367/38 |
| 5,555,531 A | * | 9/1996 | Booth et al. .................. | 367/15 |
| 5,583,825 A | | 12/1996 | Carrazzone et al. .......... | 367/31 |
| 5,682,357 A | | 10/1997 | Rigsby ......................... | 367/15 |
| 5,798,982 A | | 8/1998 | He et al. ...................... | 367/73 |

OTHER PUBLICATIONS

John Pendrel; *Seismic Inversion—The Best Tool for Reservoir Characterization*, CSEG Recorder, Jan., 2001.

John Pendrel et al.; *Methodology for Seismic Inversion and Modeling: A Western Canadian Reef Example*, CSEG Recorder, 1997, pp. 1–12.

John Pendrel, et al.; *Interpreting Sand Channels from 3C–3D Seismic Inversions*, SEG International Convention, 1998.

Robert R. Stewart; *Rapid map and inversion of P–SV waves*, Geophysics, vol. 56, No. 6 (Jun. 1991) pp. 859–862, 2 Figs.

J. P. Castagna et al.; *Relationships between compressional-wave and shear–wave velocities in clastic silicate rocks*, Geophysics, vol. 50, No. 4 (Apr. 1985), pp. 571–581, 25 Figs., 2 Tables.

D. Marion et al.; *Compressional velocity and porosity in sand–clay mixtures*, Geophysics, vol. 57, No. 4 (Apr. 1992), pp. 554–563, 15 Figs., 2 Tables.

Edwin L. Hamilton; *Shear–Wave Velocity Versus Depth in Marine Sediments*: A Review, Geophysics, vol. 41, No. 5 (Oct. 1976), pp. 985–996, 4 Figs., 2 Tables.

(List continued on next page.)

*Primary Examiner*—Edward Lefkowitz
*Assistant Examiner*—Victor J. Taylor
(74) *Attorney, Agent, or Firm*—Madan, Mossman & Sriram, P.C.

(57) ABSTRACT

The problem of detecting sedimentary formations having an abnormally high fluid pressure that are underneath a relatively impermeable formation having normal fluid pressures is addressed. At shallow depths, a formation with abnormally high fluid pressure has a shear velocity that is close to zero, and is thus significantly different from the shear velocity of overlying sediments. The high shear wave velocity contrast is detected by measuring a change in the amplitude of seismic waves reflected from the top of the abnormally pressured formation. This may be done by an amplitude versus offset (AVO) analysis of the reflected amplitudes of compressional or shear reflections. Measurements of the amplitude of reflected shear waves from a formation at some depth below the anomalous zone are may also be used to detect the presence of abnormally pressured intervals with low shear velocity and high shear wave attenuation.

23 Claims, 16 Drawing Sheets

(4 of 16 Drawing Sheet(s) Filed in Color)

OTHER PUBLICATIONS

Edwin L. Hamilton; *Prediction of In–Situ Acoustic and Elastic Properties of Marine Sediments*, Geophysics, vol. 36, No. 2 (Apr. 1971), pp. 266–284, 3 Figs., 8 Tables.

Gary Mavko et al.; *Tools for Seismic Anaylsis in Porous Media*, The Rock Physics Handbook, Cambridge University Press, Seismic Wave Propagation, 1998, pp. 60–65.

Fritz Gassmann, Elastic Waves Through a Packing of Spheres, Geophysics 1951, vol. 16, pp. 673–685.

Edwin L. Hamilton, Shear–Wave Velocity Versus Depth in Marine Sediment: A Review, Oct. 1976, Geophysics vol. 41, No. 5, pp. 985–996.

* cited by examiner

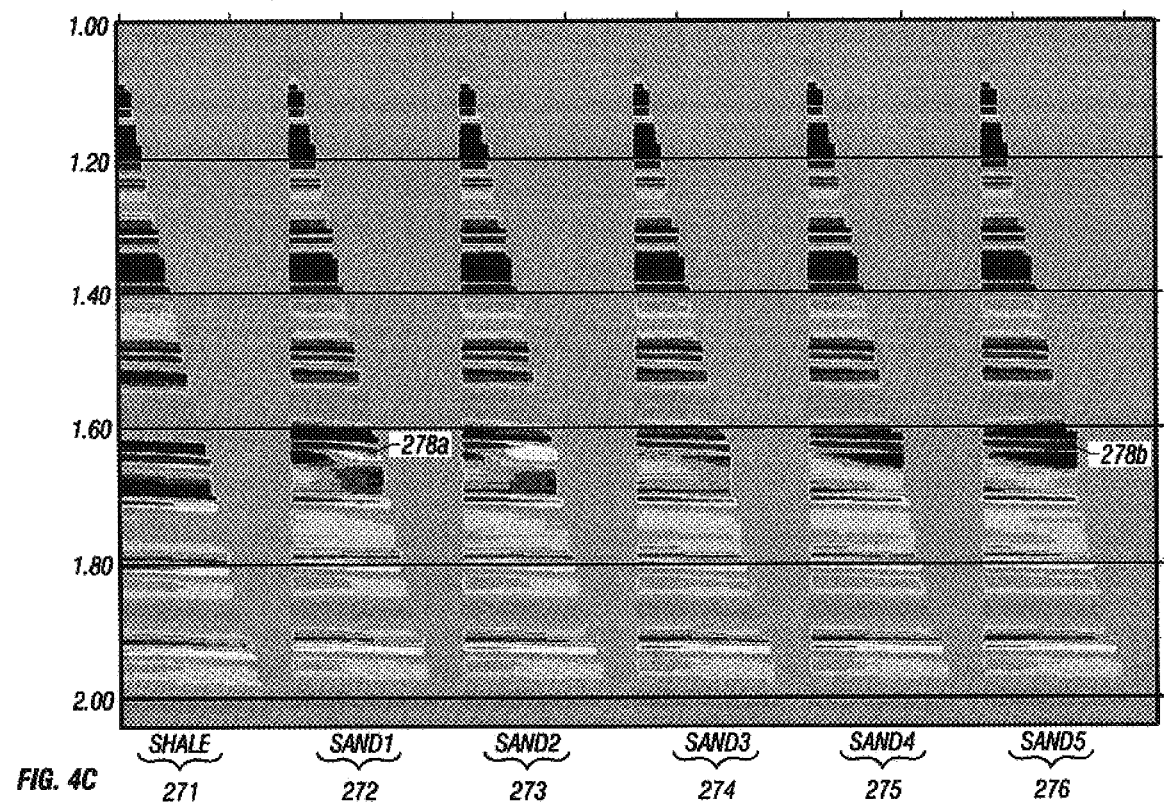

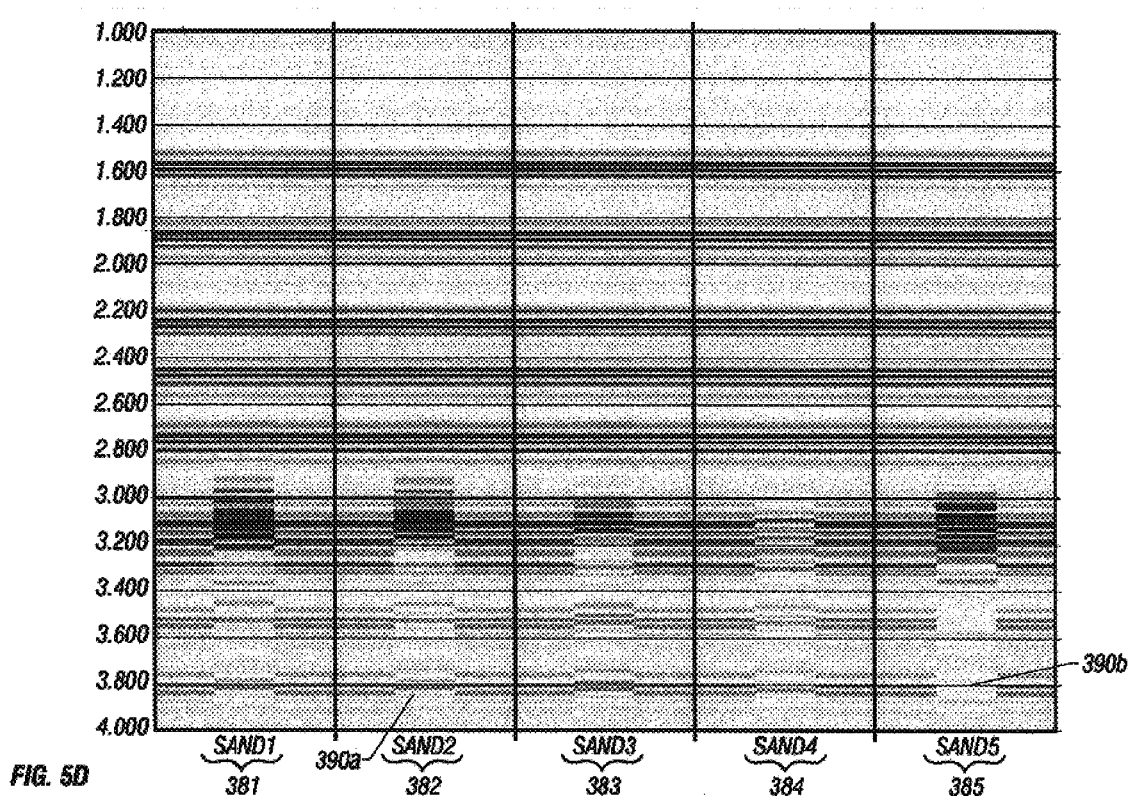

METHOD FOR IDENTIFICATION OF SHALLOW WATER FLOW HAZARDS USING MARINE SEISMIC DATA

CROSS-REFERENCES TO RELATED APPLICATIONS

This application claims priority from Provisional U.S. Patent Application No. 60/137,849 filed on Jun. 7, 1999.

BACKGROUND OF THE INVENTION

1. Field of the Invention

The present invention relates to a method of identifying anomalous zones of abnormally high pore pressures in sedimentary rocks prior to drilling at a given location. More specifically, it relates to a method of identifying zones wherein the compressional and shear velocities of the earth become extremely low by using seismic data recorded at the earth's surface.

2. Background of the Art

The most economical method of drilling a well bore is to use conventional open hole drilling techniques to drill an appropriate diameter hole with standard drilling fluid compositions. However such conventional methods are frequently not suitable where "abnormally" pressured formations may be encountered by the well bore during drilling.

At a number of offshore locations, abnormally high pore pressures have been found even at relatively shallow sub-sea bottom depths (less than about 1500 meters). This could occur if a sand body containing large amounts of water is covered by silt or clay and subsequently buried. If the burial and compaction is rapid enough, "dewatering" and compaction of silts and clays occurs before compaction of the sand. The dewatering of clays, in particular, may result in the formation of relatively impermeable shale layers that slow down the expulsion of water from the underlying sand. The result of this is that the sand may retain high amounts of fluid and the pore pressure in the sand exceeds that which would normally be expected from hydrostatic considerations alone, i.e., the fluid pressure exceeds that which would be expected for a column of water of equivalent height. This phenomenon of overpressuring is well known to those versed in the art.

In deepwater drilling, such abnormally pressured shallow sands (also known as Shallow Water Flows or SWF) have been encountered within 4000 feet of the mudline in water depths of 1500 to 8000 feet. These sands are very high porosity units (38–45%) and are virtually unconsolidated. They exist at confining pressures from 700–6500 psi, effective stresses from 0–1000 psi, and generally show differences of only hundreds of psi between the fracture gradient and pore pressure. They are abnormally pressured and when penetrated by the drill bit, they begin to flow water at high flow rates and also begin to collapse and liquefy into the well, causing massive washouts and sometimes, complete collapse and loss of the hole.

Accurate prediction of pore pressures that may be expected along the length of a drilling well, especially exploration wells, has traditionally been a difficult industry problem. Where abnormal pressures are known to exist, or may be found unexpectedly along the length of such well bores, accurate prediction of the depth at which such pressures will be encountered may be critical to the economic success of the drilling operation. The particular problem presented in the case of Shallow Water Flows is that the abnormally-pressured interval occurs at depths where the drilling is still being done using open-hole, or riserless, methods without well-control fluids. In these circumstances, it is difficult to control flows into the wellbore and the sand flows uncontrollably with loss of fluid and sand, often causing collapse of the wellbore. In some cases, the SWF interval is cased off and cemented, but later begins to flow behind casing, undermining the cement job and causing loss of structural integrity of the casing. It is, therefore, imperative that such SWF zones be identified and characterized where possible ahead of the drillbit so that these zones can be avoided during drilling.

It is well established that the velocity of propagation of compressional and shear waves in sedimentary rocks is related to the effective stress on the rock. The effective stress on a rock at a depth is defined as the difference between the overburden stress (the weight of the overlying column of material) and the internal pore pressure in the rock. Gassmann (1951) showed that for a packing of elastic spheres, the bulk modulus of the packing is proportional to the two-thirds power of the effective stress. The bulk modulus is proportional to the square of the compressional velocity of elastic waves in a material, so that some kind of power law governs the relation between the compressional velocity and the effective stress. While a packing of elastic spheres is not a good representation of sedimentary rocks, the power law is nevertheless generally accepted to be a good empirical relation between effective stress and the compressional wave (P-wave) velocity of a rock.

A sedimentary rock is a multiphase mixture. Based on theoretical considerations, the velocity of propagation of compressional waves of a mixture of quartz (the principal component of sandstone) and water must lie between two limits called the Voight and Reuss limits. The density of such a mixture of quartz and water is simply obtained by averaging the densities of the two constituents. The upper limit of the compressional velocity is obtained by averaging the bulk modulii of the two constituents while the lower limit is obtained by averaging the compressibilities of the two constituents. The lower limit treats that mixture as one in which water is in a continuous phase and the quartz is in the form of a suspension within the water. This is a reasonably good approximation of what actually happens in the real world as sand bodies are being deposited: until the porosity drops below a value around 40%, the quartz grains are not in contact and do not bear any load. As a result of this, the compressional velocity may be given by an equation known as Wood's equation and is very close to the velocity of sound in water, approximately 5000 ft./sec. However, using conventional seismic prospecting methods, an overpressured sand with such a high porosity is not easily detectable because the P-wave velocity is not much different from that expected for the overlying, slightly more compacted sediments.

There is a need for a method of identifying such SWF zones prior to drilling of a wellbore. Such a method should preferably make use of existing data so as to avoid the expense of additional data acquisition and processing. The present invention satisfies this need.

SUMMARY OF THE INVENTION

The present invention is a method of detecting Shallow Water Flow (SWF) sand formations having an abnormally high fluid pressure that are underneath a relatively impermeable formation having normal fluid pressures. The method uses the fact that at shallow depths, the SWF formation with abnormally high fluid pressure will show decreases in compressional wave velocity and displays a shear velocity for elastic waves that is close to zero, and is thus significantly different from the shear velocity of overlying sediments. In one aspect of the invention, the change in compressional and shear wave-velocity contrast is detected by measuring a change in the travel time and/or amplitude of seismic waves reflected from the top and base of the abnormally pressured formation. This may be done in one of two ways. The first way measures the increase in the travel time and/or amplitude of reflected compressional waves from the top and base of the anomalous formation with increasing angle of incidence, by using either conventional seismic prospecting using hydrophones or pressure detectors in water, or by ocean bottom pressure detectors. The second way measures the travel time and/or amplitude of the shear wave reflected from the top and base of the anomalous formation using motion sensors at the ocean bottom.

Another aspect of the invention uses measurements of the amplitude of reflected shear waves from a formation at some depth below the anomalous zone and relies on the fact that such a reflected shear wave cannot propagate through the anomalous zone without significant energy loss, and appears as a weak or undetectable event.

BRIEF DESCRIPTION OF THE DRAWINGS

The file of this patent contains at least one drawing executed in color: Copies of this patent with color drawing (s) will be provided by the Patent and Trademark Office upon request and payment of the necessary fee.

The novel features that are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 4c (in color) shows a number of common midpoint gathers illustrating offset dependence of P-P seismic traces in an embodiment of the invention.

FIG. 5d (in color) shows the effect of varying effective stress in a sand layer upon stacked P-S seismic data.

DETAILED DESCRIPTION OF THE PREFERRED EMBODIMENTS

Figure 1:
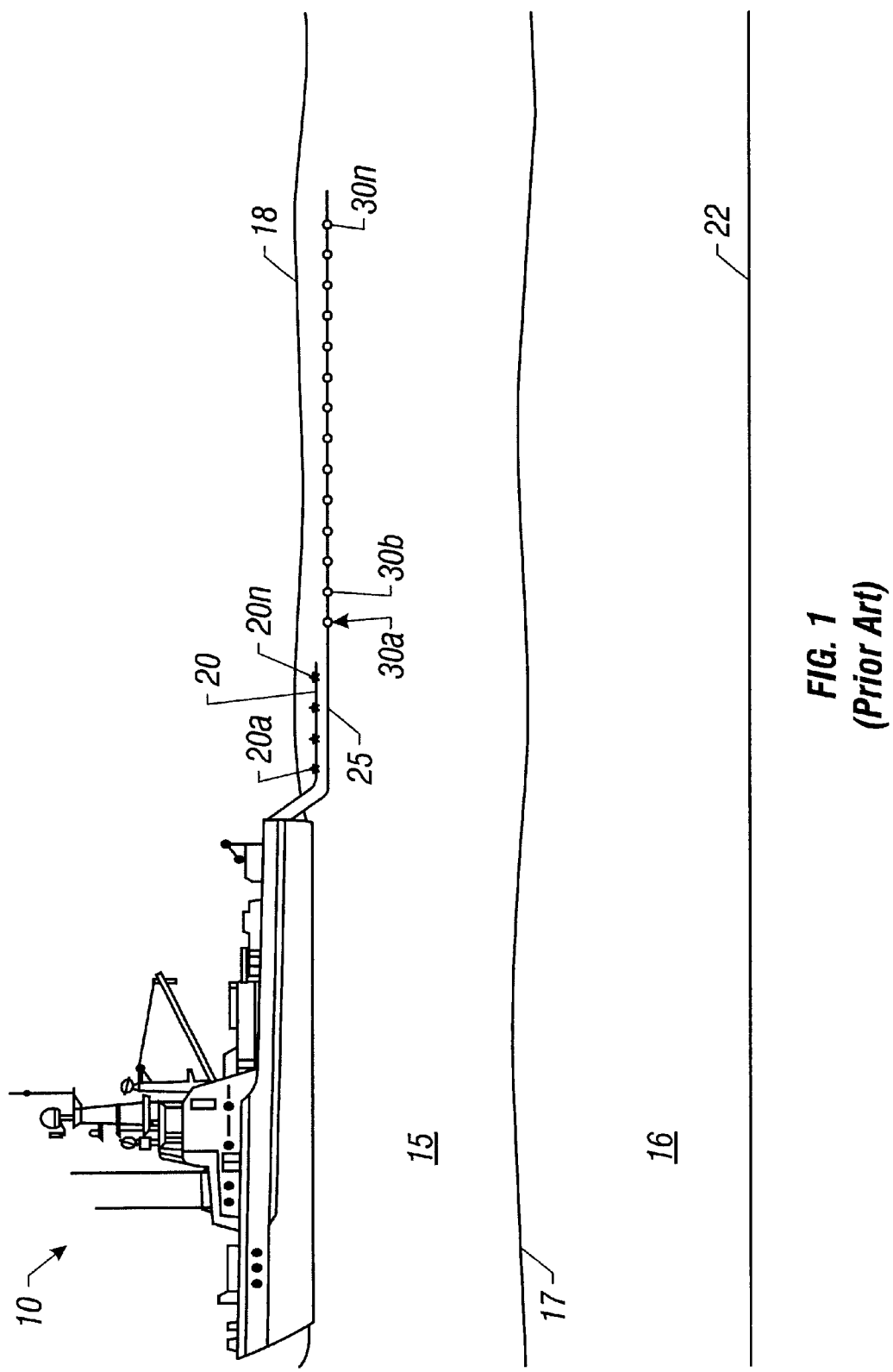
FIG. 1 (Prior Art) illustrates a conventional method of acquisition of marine seismic data.

Referring now to FIG. 1, an example of portions of a marine seismic data acquisition system is illustrated. A vessel 10 on a body of water 15 overlying the earth 16 has deployed behind it a seismic source array 20 and a streamer cable 25. The seismic source array 20 is typically made up of individual air guns $20a, 20b, \ldots 20n$ that are fired under the control a controller (not shown) aboard the vessel 10. Seismic pulses propagate into the earth and are reflected by a reflector 22 therein. For simplifying the illustration, only one reflector is shown: in reality, there would be numerous reflectors, each giving rise to a reflected pulse. After reflection, these pulses travel back to the surface where they are recorded by detectors (hydrophones) $30a, 30b, \ldots 30n$ in the streamer cable. The depth of the source array and the streamer cable are controlled by auxiliary devices (not shown).

In the seismic data acquisition system of FIG. 1, the sources and receivers are in water. As is well-known, water has a shear velocity of zero, so that the seismic signals that would be generated and detected in the water would be pressure signals, and pressure detectors such as hydrophones are used.

Figure 2:
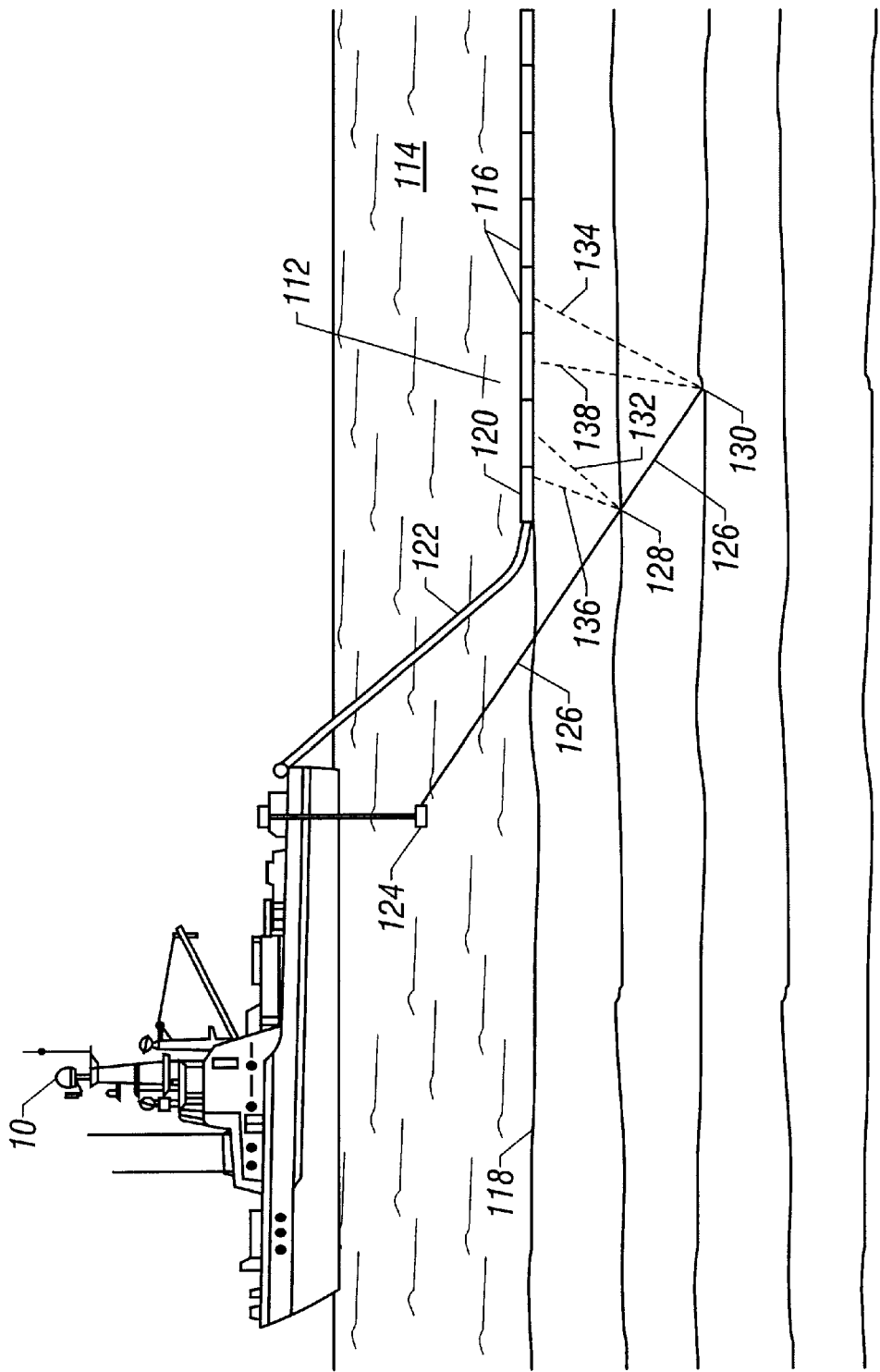
FIG. 2 (Prior Art) illustrates a method of acquisition of marine seismic data using ocean bottom detectors.
Figure 2A:
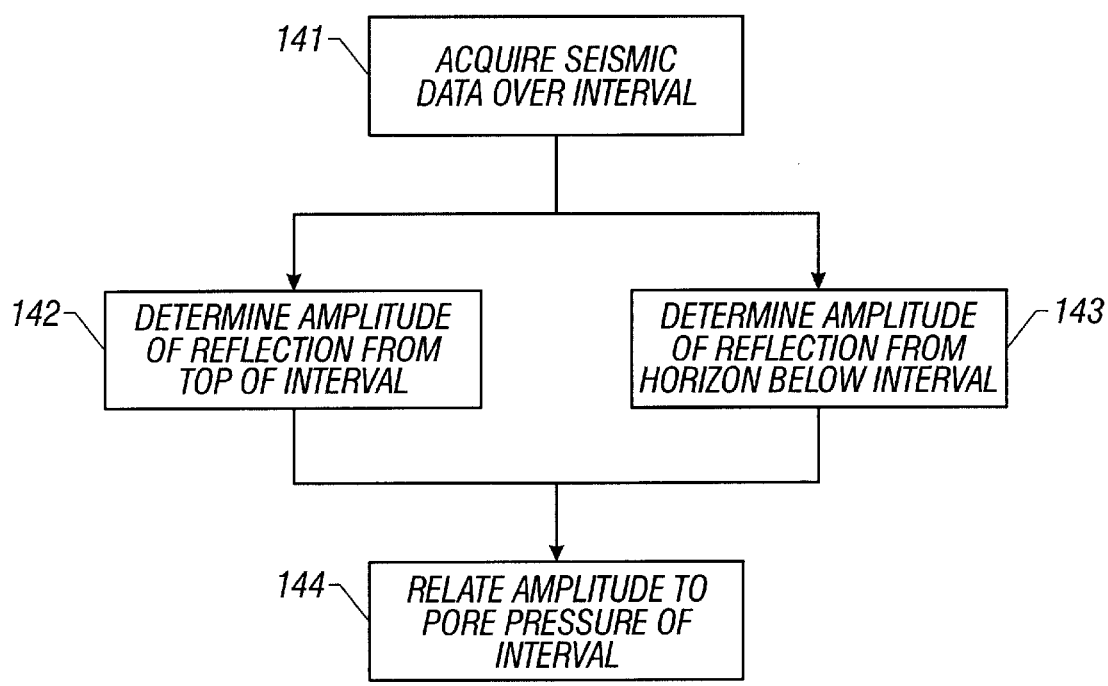
FIG. 2a is a flow chart illustrating some of the steps of the invention.

Referring to FIG. 2, a seismic exploration vessel 110 is shown deploying a marine cable 112 to seismically explore the subtstrata beneath the body of water 14. Cable 112 can be quite lengthy, for example a mile (1600 meters) or more, and is normally composed of a number of individual active sections 116 connected end to end. Each section 116 includes a plurality of geophones (motion sensors) and or hydrophones (not shown) and is positioned adjacent to the water bottom 118. Cable 112 can be positioned at the desired location by dragging it to the desired location or by reeling it in and then unreeling it at the desired location as vessel 110 moves forward. Compressional wave energy is provided by an airgun 124 or other suitable source, such as a vibrator. In another commonly used configuration, a plurality of cables are deployed on the ocean floor and subsequent to the deployment of the cables, a seismic source on a vessel is used to excite compressional waves in the water. Another method of deployment does not use cables: instead, the detectors are deployed on pods and provided with a telemetry device for sending data to a recording system.

Also shown on FIG. 2 is a raypath 126 corresponding to compressional wave (P-wave) energy. The ray 126 undergoes reflections at positions 128 and 130 from two different reflecting horizons underneath the water bottom. There are two types of reflected rays for the incident ray 126 at each of the reflection points 128 and 130. The raypaths 132 and 134 correspond to reflected P-waves while the raypaths 136 and 138 correspond to reflected shear waves (S-waves). The reflected P-waves may be easily detected by pressure detectors such as hydrophones on the cable 116. Both P-waves and S-waves may also be detected by using motion detectors, such as geophone, on the cable 116. As would be known to those versed in the art, for recording geometries commonly used in acquisition with a system such as shown in FIG. 2, the P-waves are conveniently detected by a vertical geophone while the S-waves may be detected on a horizontal detector sensitive to inline and crossline motion.

Figure 4A:
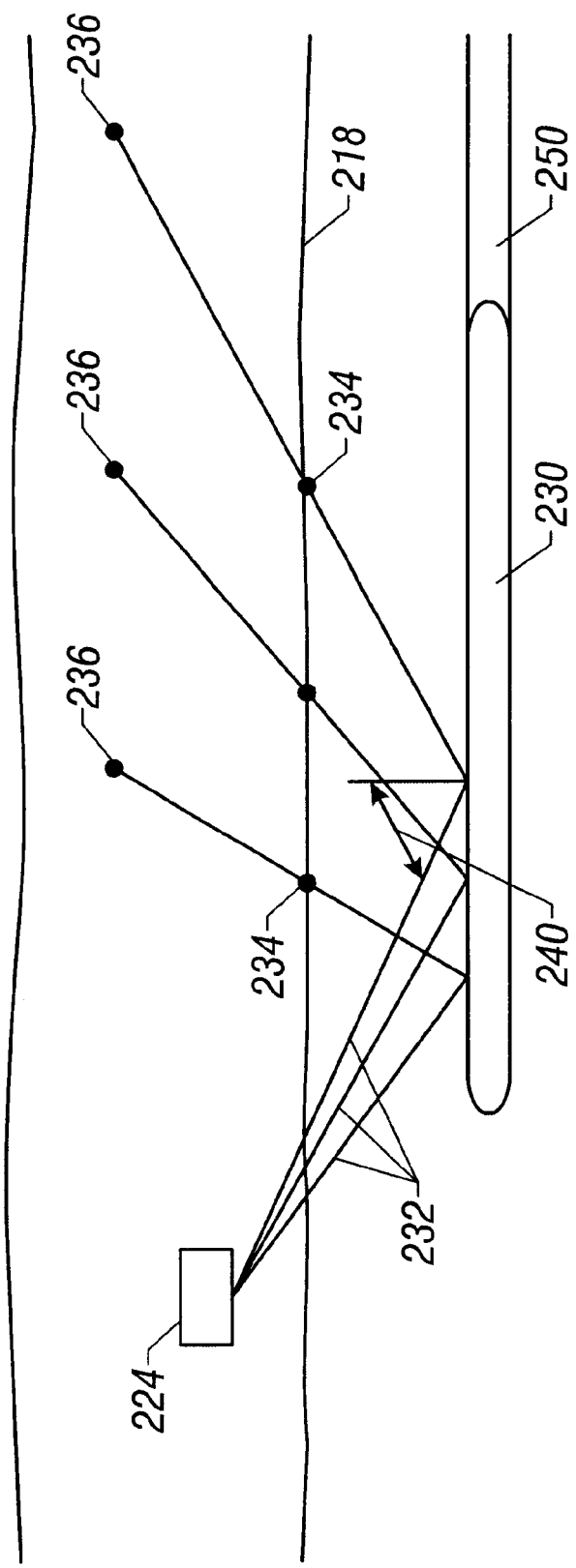
FIG. 4a is a schematic illustration of an embodiment of the present invention showing raypaths of reflections of compressional waves from the top of an anomalous zone.
Figure 4B:
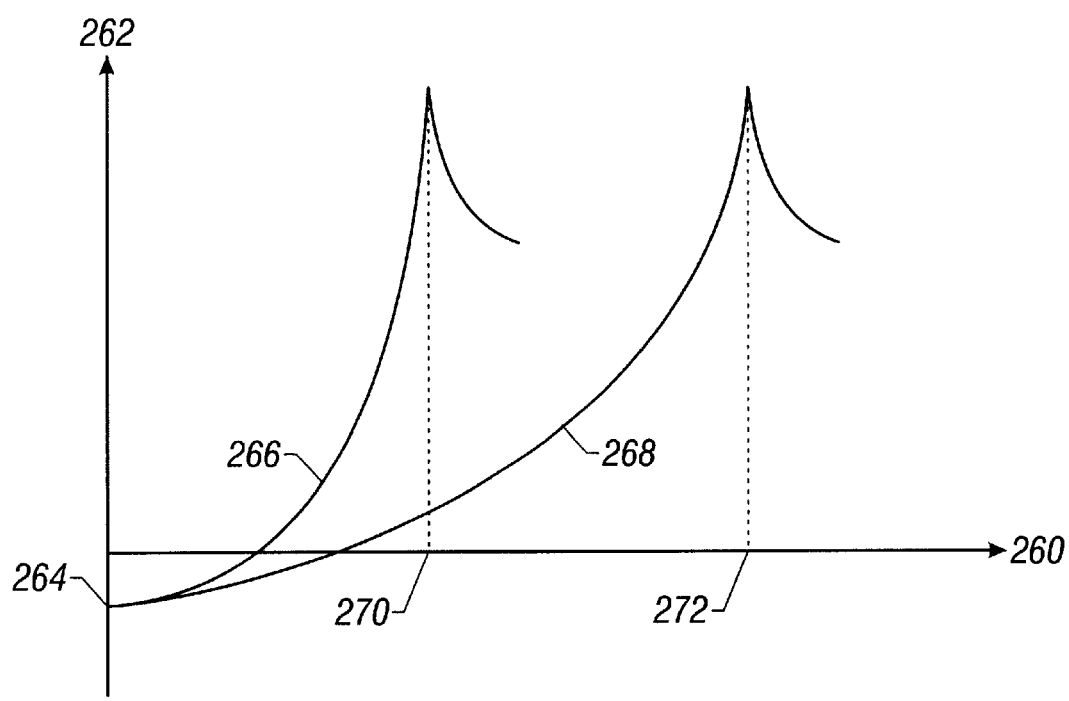
FIG. 4b is a schematic illustration of an embodiment of the present invention showing amplitudes of reflections of compressional waves from the top of an anomalous zone.

The principles of the present invention is best understood with reference to FIG. 3. Seismic data are acquired 141 over a region that potentially might include abnormally high pressured intervals. Analysis is made of the seismic reflections associated with the interval. In one embodiment of the invention, reflections from the top of the interval 142 are analyzed. In an alternate embodiment of the invention, a reflection from a horizon below the interval 143 are analyzed. In either case, the reflection amplitudes are related 144 to a possible abnormally high fluid pressure within the interval. The manner in which the relation between seismic reflections and pore pressure is discussed next, starting with a discussion on known observations of the dependence of compressional and shear velocities of sedimentary rocks on effective stress. Specifically, FIGS. 3a, 3b, 3c and 3d show relationships of compressional and shear velocities to effective stress and porosity. These are based on laboratory measurements. FIGS. 4a, 5a and 6 show methods of acquiring seismic data used in the present invention. FIGS. 4b and 5b show examples of relations between seismic reflectivity and angle of incidence. FIGS. 4c, 4d, 5c and 5d show simulations of actual seismic data according to the method of the present invention showing the effects of stress changes on seismic data.

Figure 3A:
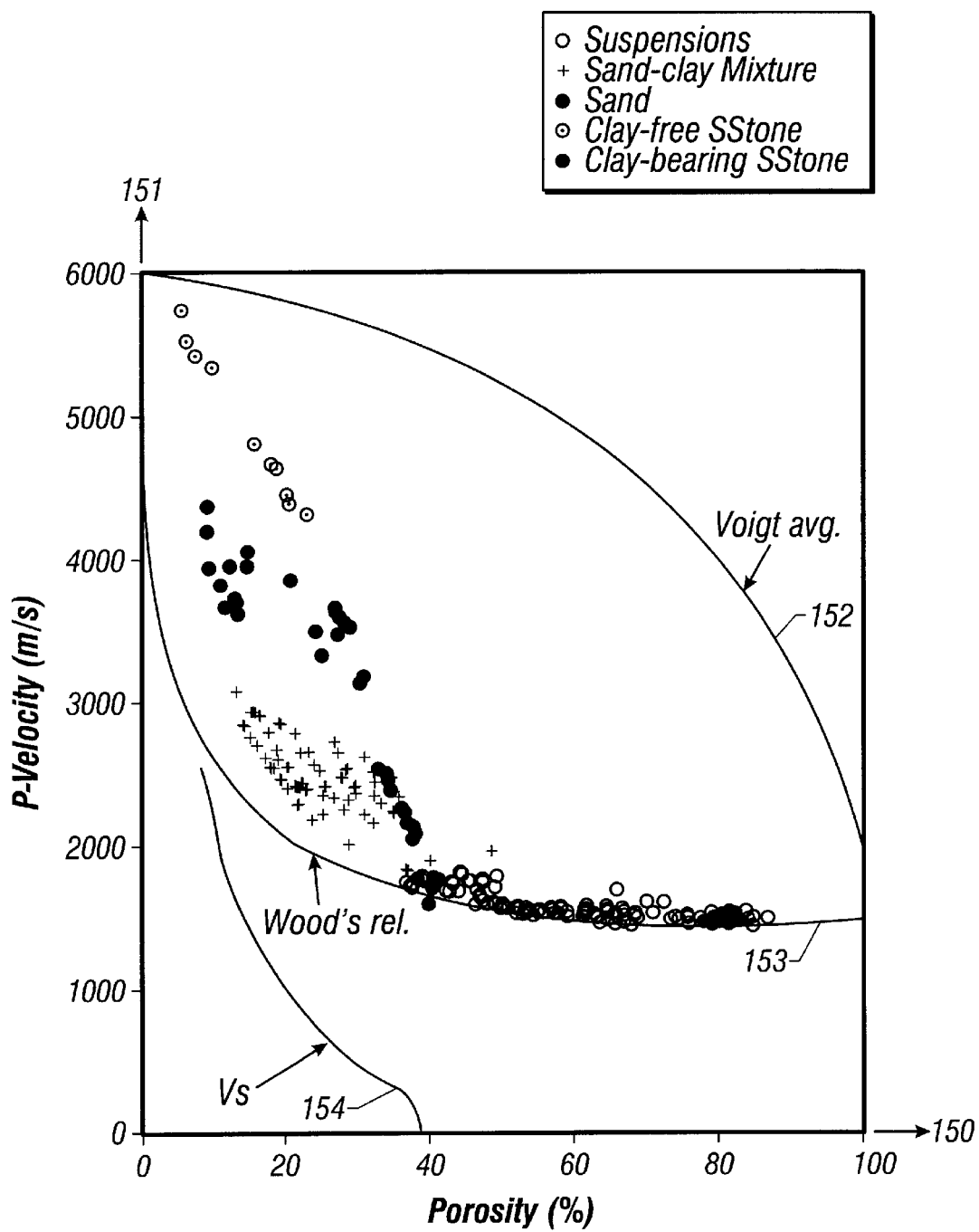
FIG. 3a (Prior Art) shows compressional and shear velocities of sands and shales.
Figure 3B:
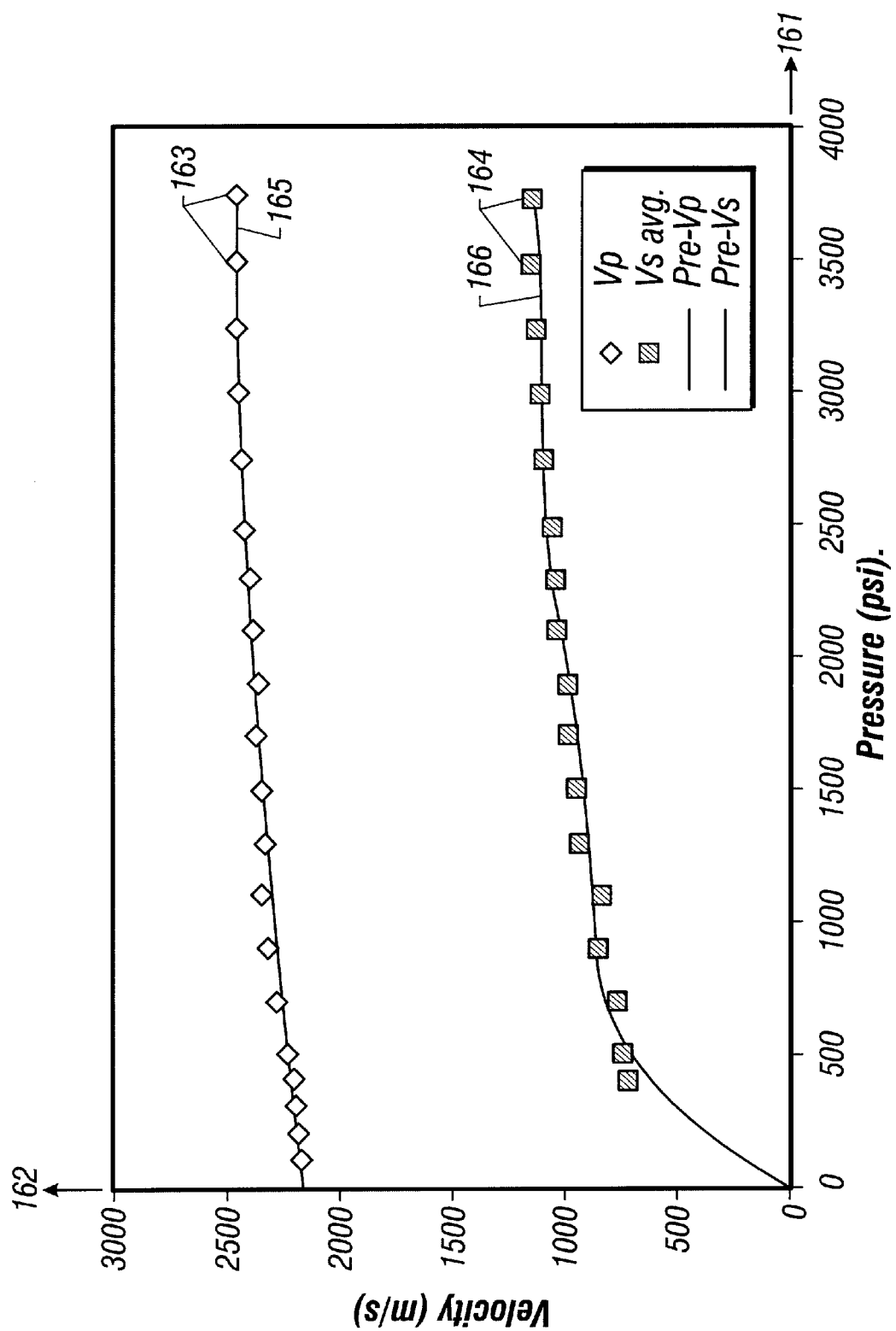
FIG. 3b shows actual measurements of compressional and shear velocities of unconsolidated sands and shales.

FIG. 3a (PRIOR ART) is taken from the work of Marion et al. (1992) and shows the behavior of compressional waves as a function of porosity in sand and shale mixtures. The abscissa 150 is the porosity of the mixture while the ordinate 151 is the compressional velocity of elastic waves in the mixture. As can be seen, the suspension samples having a high porosity, denoted by open circles fall very close to the lower limit 153 given by the well known Wood's relation. All the samples fall between the curves 152 and 153, where the curve 152 gives the Voigt limit, an upper bound that would be known to those versed in the art, and 153 is the Reuss Limit, as lower bound that would be known to those versed in the art. The clay-free sandstones fall close to the Voigt limit. Added to this diagram is the shear wave behavior for sands and shales 154 predicted using the mudrock line of Castagna (1993). FIG. 3b shows actual laboratory measurements of unconsolidated sands (porosity of 40–45%) at a range of effective stresses from 0 psi to 3750 psi. The abscissa 161 is the effective pressure in pounds per square inch (psi) while the ordinate 162 is the velocity in meters per second. Shown are actual measurements of compressional velocity 163, and averages of 2 orthogonal measurements of shear velocity 164. Also shown in FIG. 3b are a fit to the compressional 165 velocities and predicted values of shear 166 velocities as a function of effective stress. The predicted values of shear velocities are based upon the Gassman relationships between compression and shear velocities using the wet velocity data, Gassmann estimates from the dry frame measurements at pressures down to 200 psi, and the zero stress velocity limit for shear waves. Due to difficulties in measuring shear velocities on laboratory samples, in this data set there are no shear measurements below an effective stress of 400 psi.

Figure 3C:
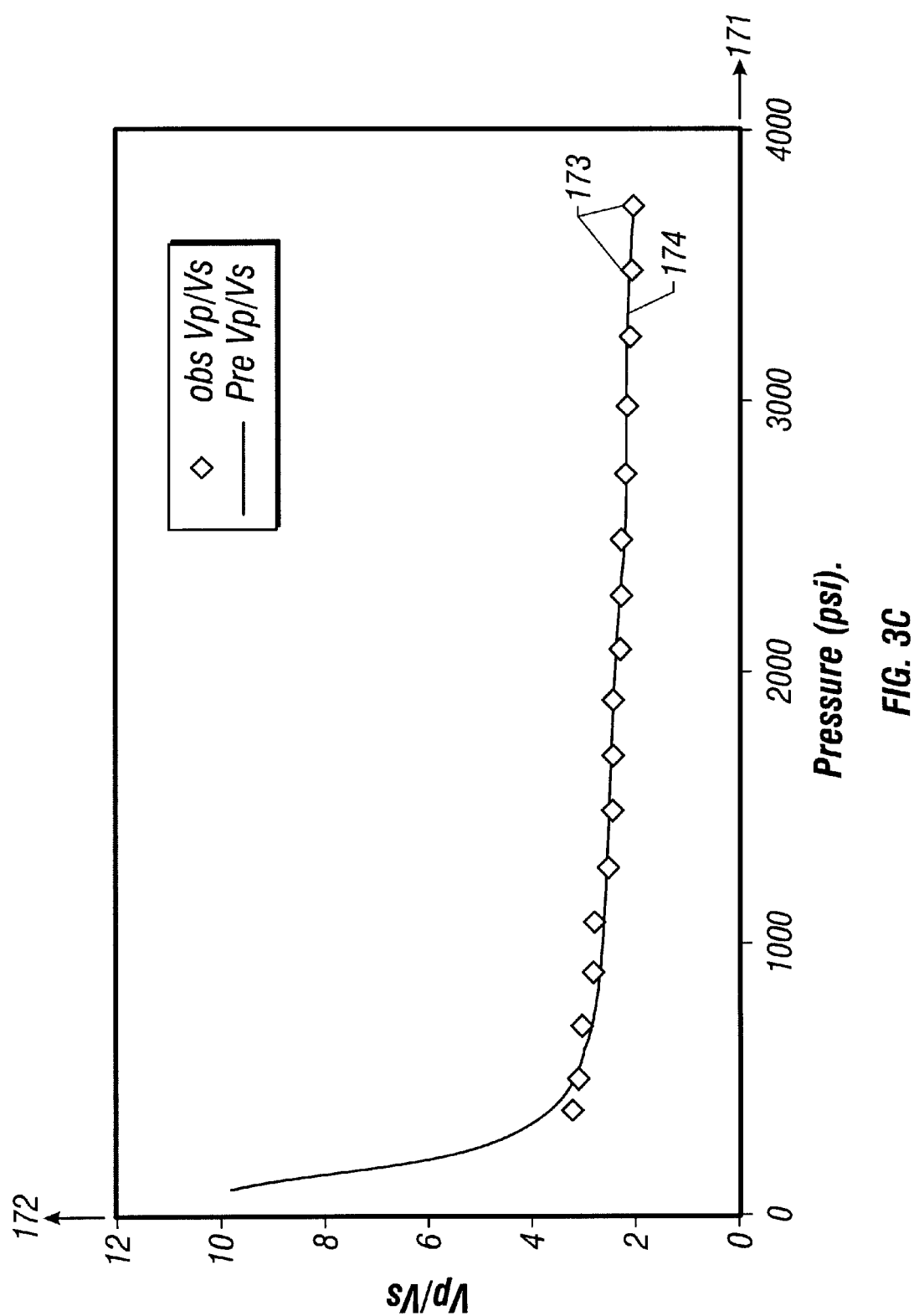
FIG. 3c shows the ratio of compressional and shear velocities for the data of FIG. 3b.

FIG. 3c shows the results of combining the data shown in FIG. 3b. The abscissa 171 is the effective stress in psi while the ordinate is the ratio (Vp/Vs) of the compressional to the shear velocity. The actual data points are denoted by 173 while the predicted relationship is given by 174.

Figure 3D:
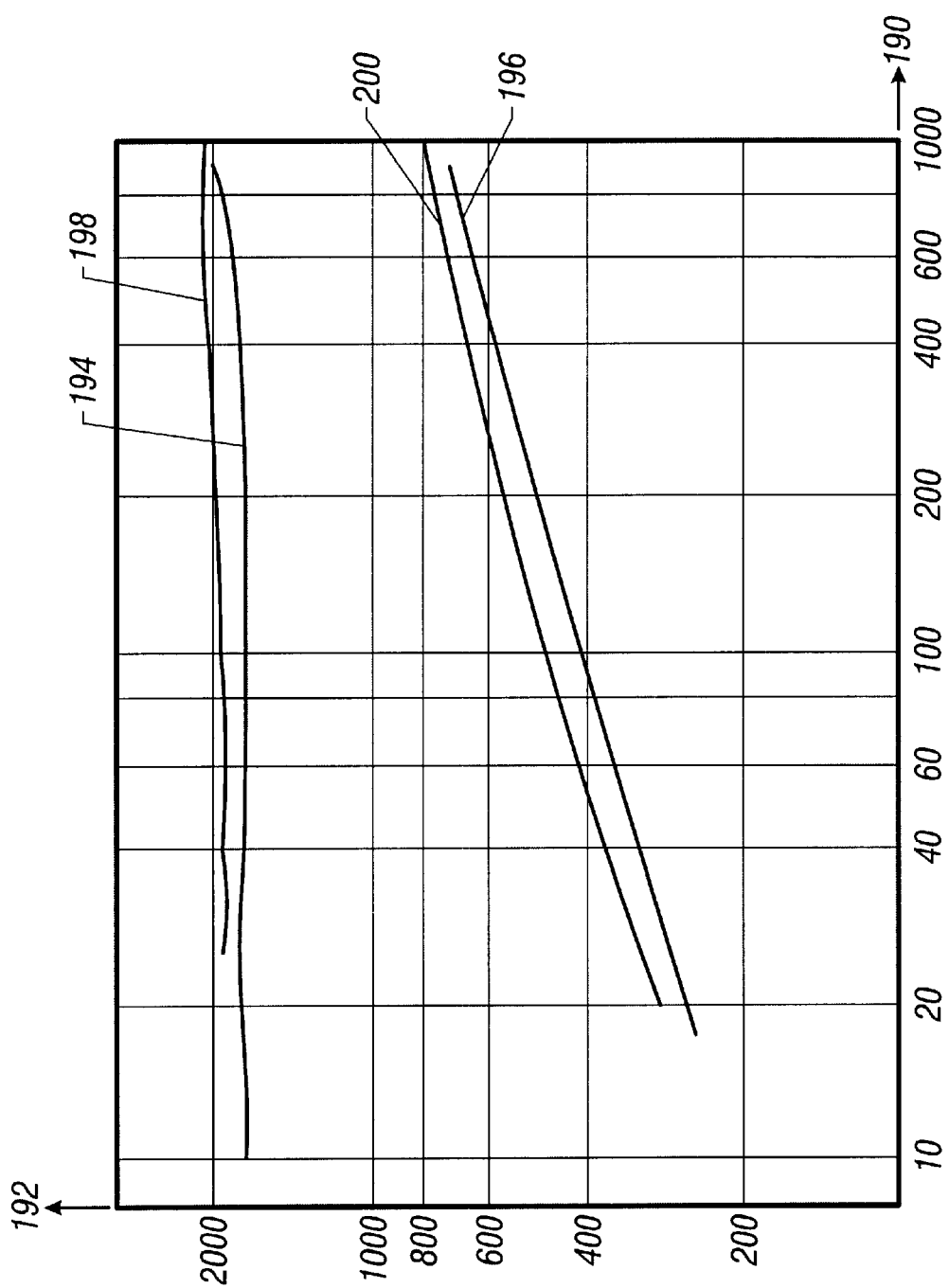
FIG. 3d (after Hamilton) shows values of compressional shear velocities of sands at low effective stresses.

As noted above, the laboratory data measurements on shear velocity could not be obtained below 400 psi. However, the predicted Vp/Vs relationship is consistent with values obtained by others for unconsolidated sand-packs. FIG. 3d, after Hamilton (1976), shows a plot of compressional and shear velocities of water saturated sands at relatively low effective stress. The abscissa 190 is the effective stress in pounds per square inc (psi) while the ordinate 192 is the velocity in meters per second (m/s). Plotted are laboratory measurements of compressional 194 and shear 196 velocities for a fine sand (grain size 0.125 to 0.149 mm.) and curves 198 and 200 for the compressional and shear velocities for a coarse sand (0.59 to 0.84 mm). The scales on both the abscissa and the ordinate are logarithmic so that at 20 psi, the Vp/Vs ratio is approximately 6.0.

It is of particular interest to note that the compressional velocities for the data of FIGS. 3b and 3d the sands shows relatively little dependence upon the effective stress, and at low stresses, is approximately 2000 meters per second. The Vp/Vs ratio, on the other hand, increases from a value of about 2.5 at 1000 psi to over 6.0 at 20 psi.

An effective stress of 1000 psi corresponds roughly to a subsea depth of approximately 2000 feet for normally pressured sediments. This is within the range where abnormally pressured SWF sands have been encountered in deepwater drilling. What FIGS. 3a–3d show is that if such a sand is buried and the fluid pressure builds up due to differential compaction or structural geopressuring, there is a small change in the compressional wave velocity and a large change in the shear velocity of the sand. This difference in shear wave velocity will manifest itself as a time delay, or "static" shift in the seismic data that will make the abnormally-pressured SWF sand appear thicker in time on the shear wave data due to the low shear velocities. Additionally, a sand with a shear velocity of 700 to 800 m/s would have a relatively small difference in shear wave impedance with an overlying clay or silt sediments whereas a sand with a shear velocity of 300 m/s or less would have a much larger difference in shear wave impedance with overlying sediments. As would be well known to those versed in the art, such a difference in shear wave impedance should be detectable by suitable seismic methods. What is important for the present invention is that the abnormal pressure in a sand body will produce a small change in compressional velocity and impedance and a large change in shear velocity and impedance: the exact magnitude of the change and the mechanism that causes the change is relatively unimportant.

Turning now to FIG. 4a, a seismic source 224 is shown deployed in a body of water above the water bottom 218. Below the water bottom is a zone of anomalous fluid pressure indicated by 230. Raypaths 232 corresponding to downgoing P-wave energy are shown. These waves are reflected and the reflected P-waves may be detected by using detectors 236 in the body of water or by using detectors 234 at the bottom of the body of water.

The detected P-waves have an amplitude associated with them that depends upon a number of factors that are well known to those versed in the art. Mathematically, they are obtained by a solution of Zoeppritz's equations, (given in a classic paper in 1919) which are not reproduced here. As summarized in *The Rock Physics Handbook*, Zoeppritz's equations may be represented in the following form:

$$\begin{pmatrix} P\downarrow P\uparrow & S\downarrow P\uparrow & P\uparrow P\uparrow & S\uparrow P\uparrow \\ P\downarrow S\uparrow & S\downarrow S\uparrow & P\uparrow S\uparrow & S\uparrow S\uparrow \\ P\downarrow P\downarrow & S\downarrow P\downarrow & P\uparrow P\downarrow & S\uparrow P\downarrow \\ P\downarrow S\downarrow & S\downarrow S\downarrow & P\uparrow S\downarrow & S\uparrow S\downarrow \end{pmatrix} = M^{-1}N \quad (1)$$

where the first arrow defines the direction of the incident wave and the second arrow defines the direction of the reflected wave and where the matrices M and N are given by $$M = \begin{bmatrix} -\sin\theta_1 & -\cos\phi_1 & \sin\theta_2 & \cos\phi_2 \\ \cos\theta_1 & -\sin\phi_1 & \cos\theta_2 & -\sin\phi_2 \\ 2\rho_1 V_{s1}\sin\phi_1\cos\theta_1 & \rho_1 V_{s1}(1-2\sin^2\phi_1) & 2\rho_2 V_{s2}\sin\phi\cos\theta & \rho_2 V_{s2}(1-2\sin^2\phi_2) \\ -\rho_1 V_{p1}(1-2\sin^2\phi_1) & \rho_1 V_{s1}\sin 2\phi_1 & \rho_2 V_{p2}(1-2\sin^2\phi) & -\rho_2 V_{s2}\sin 2\phi_2 \end{bmatrix}$$

and $$N = \begin{bmatrix} \sin\theta_1 & \cos\phi_1 & -\sin\theta_2 & -\cos\phi_2 \\ \cos\theta_1 & \sin\phi_1 & \cos\theta_2 & -\sin\phi_2 \\ 2\rho_1 V_{s1}\sin\phi_1\cos\theta_1 & \rho_1 V_{s1}(1-2\sin^2\phi_1) & 2\rho_2 V_{s2}\sin\phi\cos\theta & \rho_2 V_{s2}(1-2\sin^2\phi_2) \\ \rho_1 V_{p1}(1-2\sin^2\phi_1) & -\rho_1 V_{s1}\sin 2\phi_1 & -\rho_2 V_{p2}(1-2\sin^2\phi) & \rho_2 V_{s2}\sin 2\phi_2 \end{bmatrix}$$

In the equations, the angles $\theta$ and $\phi$ refer to the angles of P- and S-waves respectively in a first and second medium separated by a plane interface, $V_p$, $V_s$ and $\rho$ refer to P- and S-velocities and densities and the subscripts refer to the first and second medium. Various approximations of solutions of Zoeppritz's equations have been made. For small angles of incidence of an incident P-wave, the reflection coefficient $R_{pp}(\theta)$, of the reflected P-wave i.e, the $P\downarrow P\uparrow$ term above, has a value that is approximately given by $$R_{pp}(\theta) \approx A + B\sin^2\theta \quad (2)$$

where the coefficient B depends upon the difference in shear velocity across the reflecting interface. Similarly, the reflection coefficient $R_{ps}(\theta)$ of the reflected shear wave for an incident P-wave is approximately given by a relation of the type $$R_{ps}(\theta) = C\sin(\theta) \quad (3)$$

Qualitatively, the amplitude of the reflected P-wave depends upon the angle of incidence (depicted in FIG. 4a by 240) of the P-waves at the top or base of the anomalous zone. The variation is schematically depicted in FIG. 4b where the abscissa 260 is the angle of incidence and the ordinate 262 is the reflection coefficient, defined as the ratio of the amplitude of the reflected wave to the amplitude of the incident wave. The curve in FIG. 4b is obtained by an exact solution of the Zoeppritz' equations and not by the approximations given by eqs. (2) and (3). The reflection coefficient may be determined from the signals detected by the detectors 234 or 236 using methods known in the art. This includes a correction for spreading of the energy from the source (the spreading correction) and other correction factors for adjusting the detected signals for the geometry of the raypath.

The curve 266 shows how this reflection coefficient shown in the ordinate 262 changes with the angle of incidence on the abscissa (increasing to the right) 260 in a sand that is abnormally pressured. For plane waves, these reflection coefficients may be calculated using Zoeppritz's equations or approximations thereof. Such angle dependent behavior is called Amplitude versus Offset (AVO) behavior. At small angles of incidence, corresponding to a vertical raypath, the reflection coefficient has a small value that depends on the difference in P-wave velocities between the anomalous zone and the overlying sediment. This value is typically small. As the angle of incidence increases, the reflection coefficient changes its value according as indicated and reaches a large value at an angle such as 270 and then decrease again. This angle is called the critical angle.

As depicted in FIG. 4b, the reflection coefficient changes its sign from a small negative value to a large positive value. In other situations, it may change from a small positive value to a large positive value, or reverse polarity from negative to positive, or positive to negative in sign.

In comparison, the curve 268 depicts what would be expected from the same region if it did not have an abnormal pressure. For illustrative purposes, FIG. 4a shows a region 250 at the same depth as the abnormally pressured region 230. As can be seen, the rate of change of the P-wave reflection coefficient is much slower and the large value of the reflection coefficient is attained at an angle of incidence 272 that is larger than the value 270 for the abnormally pressured zone. Qualitatively, for the types of sediments under consideration, the critical angle depends primarily upon the compressional and shear wave velocities in the upper and lower media. The empirical and mathematical aspects of this dependency are discussed below.

The AVO behavior discussed above is for illustrative purposes only. The exact AVO behavior at a plane interface depends upon the densities, compressional velocities and shear velocities of the materials on the two sides of the interface. For the problem of interest, i.e., identification of an SWF sand, the analysis may be carried out for the upper boundary of the SWF sand, or the lower boundary of the SWF sand, or both. Those versed in the art would recognize that commonly, due to the limited bandwidth of seismic signals, there is interference of reflections from the upper boundary and the lower boundary.

FIG. 4c shows common midpoint (CMP) gathers of P-P (compressional wave source and compressional wave detector) seismic data illustrating the AVO behavior and interference effects. The vertical scale is time and within each gather, the source-receiver distance increases from left to right. The reference panel 271 shows synthetic data for a model consisting of normally pressured shales. For obtaining the data of panel 272, a sand layer with an effective pressure of 2000 psi was inserted into the model corresponding to a time of 1.6 seconds. The change in the AVO behavior at this level is noticeable when compared to panel 271 and is due to the contrast in shear velocity of the sand relative to the surrounding shales. The model was then modified to simulate sands at 1000 psi (gather 273), 500 psi (gather 274), 300 psi (gather 275) and 100 psi (gather 276). The change in the reflected P-P seismic data as a result of changing effective formation pressure is striking. At small offsets 277 (traces on the left of each gather), there is a decrease in the amplitude of the reflection strength with decreasing effective stress, i.e., from the panel 272 to the panel 276. At the same time, while the panel 272 shows a slight decrease in amplitude with offset at large offsets 278a, the panel 276 shows a large increase in amplitude with offset at large offsets 278b. All of these panels were produced using a wave-equation elastic simulation, rather than using Zoeppritz's equations. Such a simulation would be known to those versed in the art.

In one aspect of the invention, a quantitative measure of this change in the reflection character is obtained. Actual seismic data comprising panels such as those shown in FIG. 4c are stacked and/or migrated according to known methods to produce a zero-offset seismic section discussed next with reference to FIG. 4d.

Figure 4D:
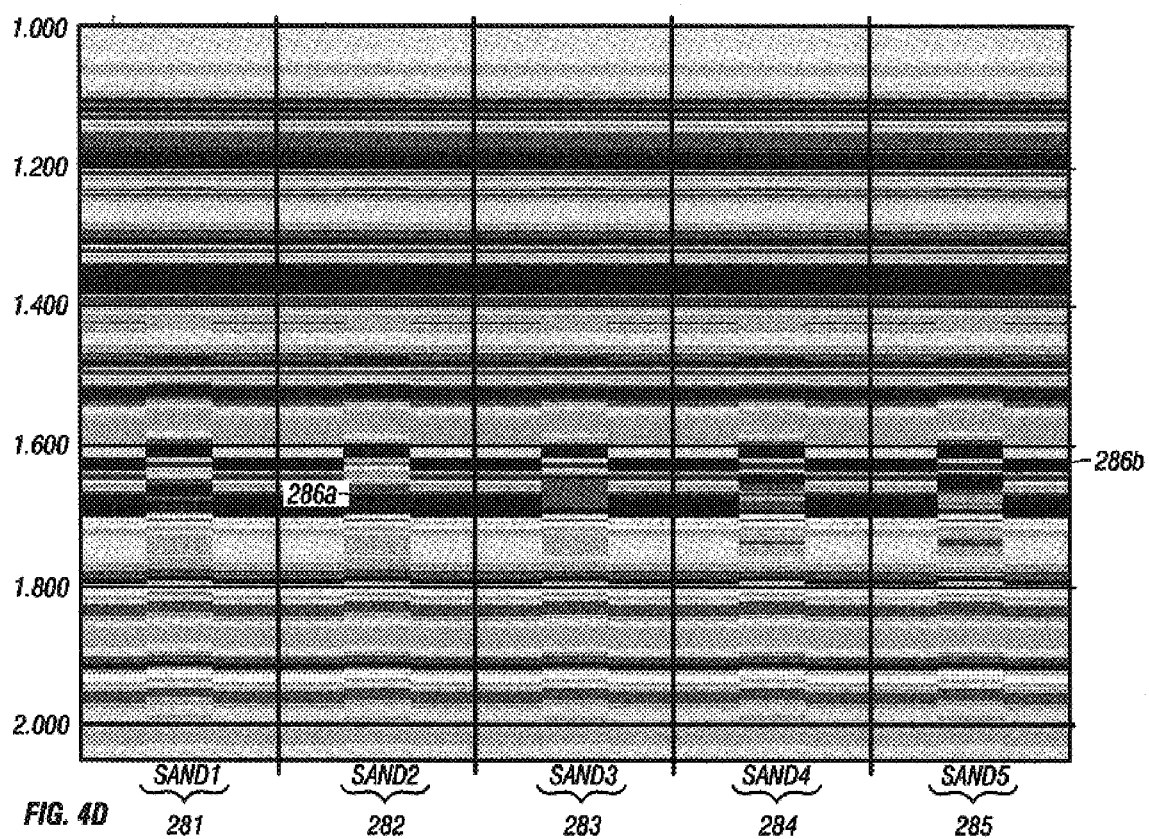
FIG. 4d (in color) shows a comparison of stacked midpoint gathers of P-P data showing the effect of varying effective stress in a sand layer.
Figure 5A:
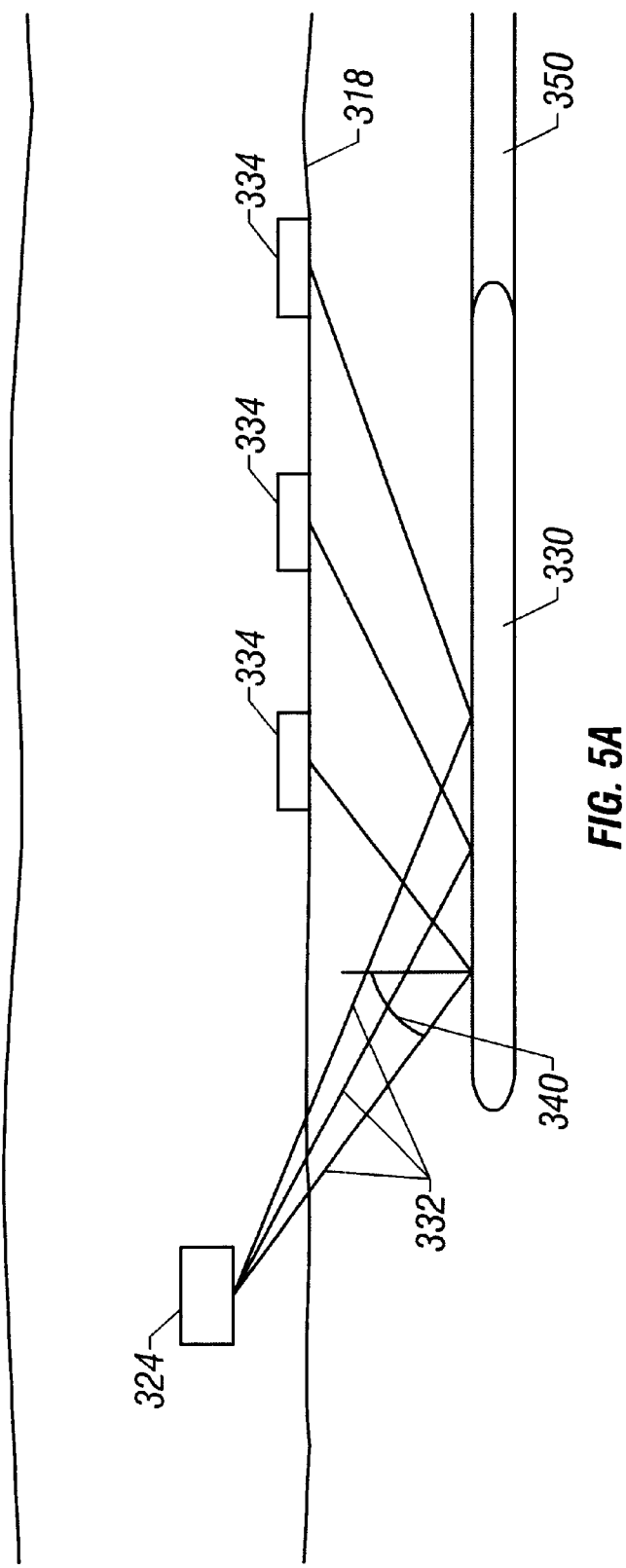
FIG. 5a is a schematic illustration of an embodiment of the present invention showing raypaths of reflections of shear waves from the top of an anomalous zone.
Figure 5B:
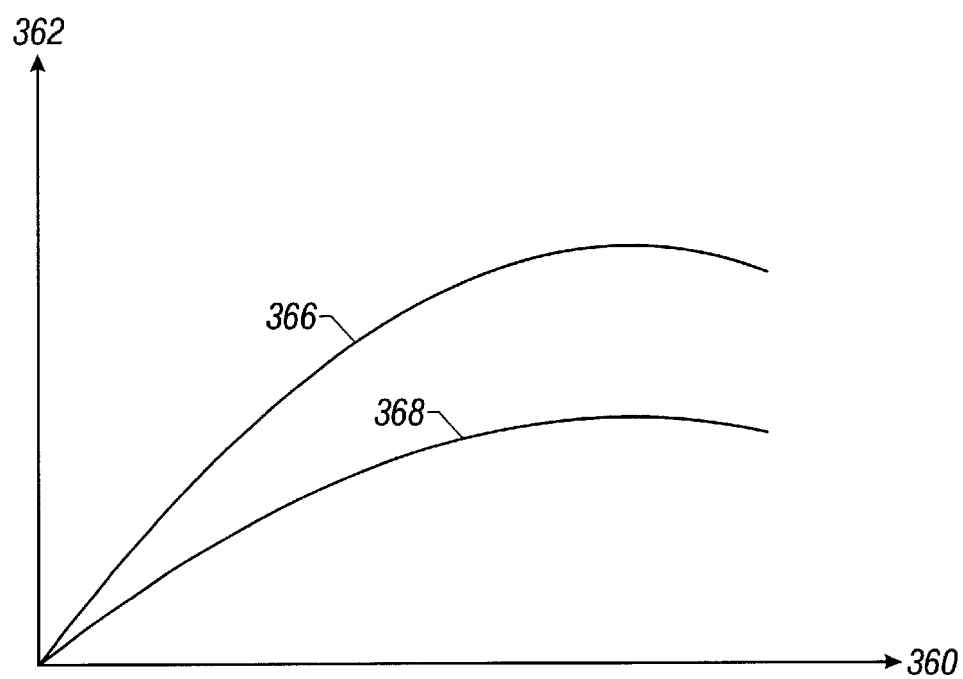
FIG. 5b is a schematic illustration of an embodiment of the present invention showing raypaths of reflections of shear waves from the top of an anomalous zone.

Turning now to FIG. 4d, five panels 281, 282, 283, 284, and 285 of simulated, stacked data are shown. Within each panel, there are three groups of traces. The first and third groups in all of the panels are the results of stacking gather 271 from FIG. 4c. The results of this stacking has been repeated to provide some visual continuity in display. Within the panel 281, the middle group of traces is the result of stacking the gather 272 from FIG. 4c. As before, a single trace has been repeated to provide some visual continuity. Within the panel 282, the middle group of traces is the results of stacking the gather 273 and so on, i.e., the middle group of traces in panel 283 is the result of stacking the gather 274, the middle group of traces in panel 284 is the result of stacking the gather 275 and the middle group of traces in panel 285 is the result of stacking the gather 276. As in FIG. 4c, the result of changes in the effective stress of the sand layer on the reflected data are noticeable. The amplitudes at 286b at the lowest effective stress (100 psi) for the sands are much larger than the amplitudes at 286a, for a higher effective stress (1000 psi).

Those versed in the art would recognize that the reference stacked traces depicted in FIG. 4d may be inverted to obtain an impedance model of the subsurface. U.S. Pat. No. 5,798,982 issued to He and Anderson, for example, shows such an inversion. The inverted model comprises layers having associated velocities that can be readily interpreted using data such as in FIG. 3 to obtain effective stresses.

In another aspect of the invention, a prestack inversion of seismic gathers, i.e., the gathers such as those in FIG. 4c is carried out. For example, U.S. Pat. No. 5,583,825 issued to Carrazone et al. discloses a method of deriving compressional and shear velocities of the subsurface by prestack inversion. In the present invention, these derived shear velocities are used as an indicator of effective stress in the formation.

Another embodiment of the invention uses the well-known phenomenon of conversion of P-waves to S-waves upon reflection. Referring now to FIG. 5a, a seismic source 324 is shown deployed in a body of water above the water bottom 318. Below the water bottom is a zone of anomalous fluid pressure indicated by 330. Raypaths 332 corresponding to downgoing P-wave energy are shown. These waves are reflected and the reflected S-waves may be detected by using detectors 334 at the bottom of the body of water.

The detected S-waves have an amplitude associated with them that depends upon a number of factors that are well known to those versed in the art. Mathematically, like the reflected P-waves, their amplitudes are obtained by a solution of Zoeppritz's equations, which are not reproduced here. Various approximations of solutions of Zoeppritz's equations have been made. Qualitatively, the amplitude of the reflected P-wave depends upon the angle of incidence (depicted in FIG. 5a by 340) of the P-waves at the top or base of the anomalous zone. The variation is schematically depicted in FIG. 5b where the abscissa 360 is the angle of incidence and the ordinate 362 is defined as the ratio of the amplitude of the reflected S-wave to the amplitude of the incident P-wave. The reflection coefficient ratio may be determined from the signals detected by the detectors 334 using methods known in the art. As discussed above with respect to the amplitude of the reflected P-wave, this includes a correction for spreading of the energy from the source (the spreading correction) and other correction factors for adjusting the detected signals for the geometry of the raypath.

The curve 366 shows how this reflection coefficient ratio changes with the angle of incidence 360 in a sand that is abnormally pressured. The reflected shear wave amplitude has value substantially equal to zero at small angles of incidence 360, corresponding to a vertical raypath. As the angle of incidence increases, the reflection coefficient ratio increases its value according as indicated and reaches a large value at an angle such as 270 and then decreases again.

In comparison, the curve 368 depicts what would be expected from the same region if it did not have an abnormal pressure. For illustrative purposes, FIG. 5a shows a region 350 at the same depth as the abnormally pressured region 330. As can be seen, the rate of change of the S-wave reflection coefficient is much slower and the maximum value that is obtained is less than for the abnormally pressured region. As discussed above with reference to FIG. 3, when the sand is abnormally pressured, its shear velocity is almost zero, giving a larger reflection coefficient with the overlying medium than when the sand is normally pressured and has a shear velocity that is different from zero.

Figure 5C:
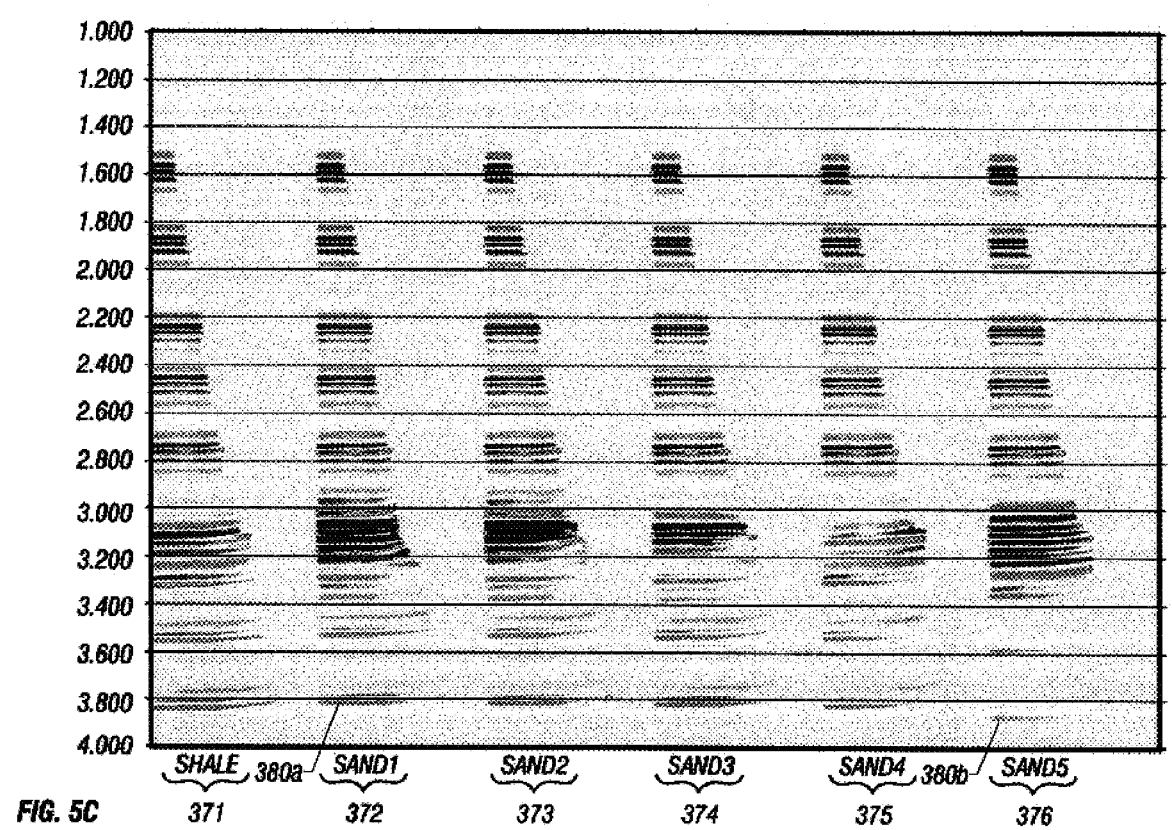
FIG. 5c (in color) shows a number of common midpoint gathers illustrating offset dependence of P-S seismic traces in an embodiment of the invention.
Figure 6:
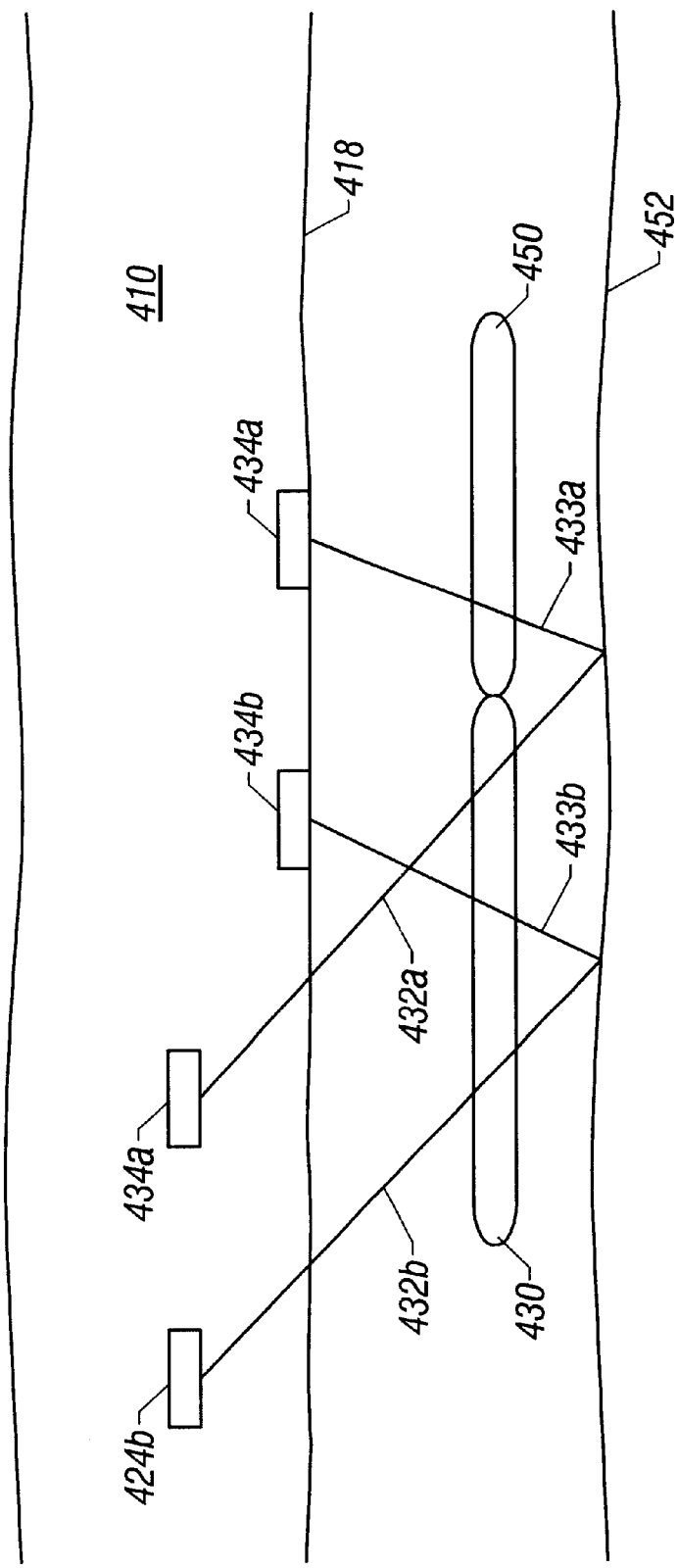
FIG. 6 is a schematic illustration of an embodiment of the present invention showing raypaths of reflected shear waves from a reflector underneath the anomalous zone.

FIG. 5c shows gathers of P-S (compressional wave source and shear wave detector) seismic data illustrating this effect. As before, these are obtained by a solution of the elastic wave equation rather than relying on Zoeppritz's equations. Those versed in the art would recognize that the reflection point for a P-S reflection does not lie midway between the source and the receiver position even for horizontal reflectors and that a sort point other than a common midpoint may be required. The present invention is capable of using any such other sort point for P-S reflections as well as for P-P reflections. As in FIG. 4c, the vertical scale is time and within each gather, the source-receiver distance increases from left to right. The time scale is different from that in FIG. 4c due to the lower velocity of the reflected shear waves. The reference panel 371 shows synthetic data for a model consisting of normally pressured shales. Those versed in the art would recognize that for zero-offsets, the P-S reflection coefficient is zero and accordingly, the amplitudes are relatively small. For obtaining the data of panel 372, the sand layer with an effective pressure of 2000 psi corresponds to a P-S time of about 3.1 seconds. The model was then modified to simulate sands at 1000 psi (gather 273), 500 psi (gather 274), 300 psi (gather 275) and 100 psi (gather 276Qualitatively, it appears that for the model values chosen, the reflected P-S amplitudes decrease down to 300 psi (panel 375) and increase at very small values (100 psi)

of the effective stress (panel 376). Another point of interest is that reflections below the sand layer get progressively delayed and weaker as the effective stress (and shear velocity of the sand) are decreased. Compare, for example, the change in reflection time for the same reflector 380*a* when the sand at the level of interest (~3.1 seconds) is at 2000 psi and 380*b* when the sand at the level of interest is at 100 psi. The delay is due to the reduction in the shear velocity of the sand and the fact that P-S reflections from deeper horizons have to pass through the sand layer on the way back up as a shear wave. The weakening of the deeper reflections between panels 372 and 376 is due to increased attenuation of shear waves passing through the low velocity sand layer. This is discussed below with reference to FIG. 6.

Turning now to FIG. 5*d*, five panels 381–385 of stacked P-S data are shown. These are similar to the panels of FIG. 4*d* with three groups of traces within each panel, with the first and third group of traces in each panel consisting of stacked P-S data corresponding to gather 371 (reference panel) with the middle group of traces in each panel corresponding to sands at different effective stresses. Those versed in the art would recognize that such a stacking may be performed in a manner similar to that used for stacking of P-P data: the only difference being a difference in the stacking velocity relative to that of P-P data. The velocities required for stacking or migrating the data are obtained using methods similar to those used in obtaining this information for P-P data. Careful review of the stacked traces shows that the reflection polarity of the sand reflection reverses polarity between panels 383 and 385. The effect of time delay and attenuation may be seen in the deeper reflections. Compare, for example, 390*a* when the sand at 3.1 seconds is at 1000 psi with 390*b* when the sand is at 100 psi. There is a decrease in the signal amplitude from 1000 psi to 100 psi and also a decrease in the bandwidth that is evident visually.

Actual seismic data comprising panels such as those shown in FIG. 5*c* may also be migrated according to known methods to produce a zero-offset seismic section (not shown). The post-stack and prestack inversion discussed above with reference to FIG. 4 are equally applicable to P-S data Turning now to FIG. 6, another way of detecting the presence of an abnormally pressured region with a very low shear velocity is illustrated. Shown are a body of water 410 having motion detectors 434*a*, 434*b* at the bottom 418 of the body of water. Also shown are a normally pressured region 450 and an abnormally pressure region 430 having a very low shear velocity in accordance with the discussion above with reference to FIG. 3. When a source is at location 424*a*, the outgoing compressional wave, denoted by the raypath 432*a* is partially reflected as a shear wave denoted by 433*a* from an underlying reflecting interface 452 and detected by the motion detector 434*a*. When the source is at location 424*b*, the downgoing compressional wave denoted by raypath 432*b* passes through the abnormally pressured interval 430 relatively unaffected: as discussed above, the compressional wave velocity in the abnormally pressured zone is only slightly affected by the effective stress.

The increase in pore pressure also causes the shear modulus and frame modulus to weaken significantly, causing a large increase in attenuation for energy propagating through the abnormally pressured sand. A review of P-wave Quality Factor (Q) data indicates that P wave Q varies between 100 at normal pressures in SWF sands to values of 10 to 20 at low effective pressures. In comparison, S-wave Q varies between 100 at normal pressures in SWF sands down to zero at very low effective pressures. These changes in the Q ratio correlate closely to the Vp/Vs ratio, so that S waves are attenuated more severely than P waves. In particular, the compressional waves that are converted to shear waves on reflectors below the sand will show severe attenuation as they try to travel upward through the abnormally pressured interval. Hence, the multicomponent data will, upon display, show severe dimming and loss of higher frequencies of the mode-converted waves that have partial ray paths through any pressured sand interval. In the present invention, this dimming may be determined by measurement of the amplitude of the reflected waves relative to a location where the dimming is not present. The loss of higher frequencies is measured by a spectral analysis of the data using known methods. These zones of severe attenuation can be correlated to the presence of the abnormally-pressured sand and can be used to map out the extent of the sand much like the AVO behavior above.

Thus, reflected shear wave 434*b* from the deeper reflector 452 is not able to pass through the anomalous zone, or if it does, it is severely attenuated and delayed, so that a detector at location 434*b* will not pick up a reflected shear wave. Those versed in the art would recognize that the absence or delay of a reflected shear wave could also be detected on data from a single source, rather than the two different source positions illustrated in FIG. 6. However, the analysis of the data would be somewhat more difficult because of the variation in the reflection coefficient of the reflected shear wave at the interface 452 with angle of incidence.

When analyzed together, the combined effects of velocity anomalies, AVO anomalies, and attenuation anomalies caused by changes in effective stress in SWF sands can be used to identify, delineate and characterize the pressure regime in these hazards. A robust analysis of these SWF sands requires seismic acquisition and processing methods that preserve amplitude and phase information, and do not distort the frequency content of the seismic signals. The anomalous signatures can then be identified using a combination of P-wave travel time tomography, coupled tomography of downgoing P-wave and upgoing S-wave events, AVO analysis, post-stack inversion, pre-stack inversion, attenuation analysis, and seismic attribute analysis. These anomalies can be mapped in 2D or 3D to delineate the extent and thickness of specific SWF zones. In cases where the data permit an accurate estimate of the velocities and modulii of the sand, a specific prediction of the pore pressure can be made using the velocity-effective pressure calibration shown in FIG. 3, calibrated to local well control information where appropriate, along with an estimate of the overburden.

The foregoing description has been limited to specific embodiments of this invention. It will be apparent, however, that variations and modifications may be made to the disclosed embodiments, with the attainment of some or all of the advantages of the invention. In particular, the invention may be modified to make density and acoustic measurements. Therefore, it is the object of the appended claims to cover all such variations and modifications as come within the true spirit and scope of the invention.

What is claimed is:

1. A method of obtaining an indication of all abnormal fluid pressure in an interval in the earth the method comprising:
    (a) activating a seismic source at least one location to propagate seismic waves into the earth;
    (c) using a plurality of seismic sensors spaced apart from the seismic source to detect seismic waves reflected from at least one of (i) an upper boundary of the interval, (ii) a lower boundary of the interval, and, (iii) a reflecting interface below the interval, wherein a characteristic of the detected seismic waves is responsive to the abnormal fluid pressure; and (c) using said characteristic of the detected seismic waves for obtaining said indication.

2. The method of claim 1 wherein the at least one location of the source is in a body of water overlying the earth and the plurality of detectors comprise at least one of (A) pressure sensors within the body of water, (B) pressure sensors at a bottom of the body of water, (C) velocity sensors at a bottom of the body of water, and D) acceleration sensors at a bottom of the body of water.

3. The method of claim 1 wherein the detected seismic waves are reflected from at least one of the upper boundary and the lower boundary of the interval, and said characteristic is an amplitude of the detected seismic waves and wherein using the amplitudes of the detected seismic waves further comprises evaluating a variation of the amplitude of the detected seismic waves as a function of an offset distance from the source to each of the plurality of seismic sensors.

4. The method of claim 3 wherein evaluating a variation of the amplitude of the reflected seismic waves with the offset distance is based at least in part on solving Zoeppritz's equations.

5. The method of claim 4 wherein at least one location of the seismic source is in a body of water, the reflected seismic waves are compressional waves and the seismic detectors further comprise at least one of (A) a pressure sensor in the body of water, (B) a pressure sensor at a bottom of the body of water, and (C) a vertical motion sensor at a bottom of the body of water.

6. The method of claim 4 wherein the at least one location of the seismic source is in a body of water, the reflected seismic waves are shear waves, and the seismic detectors further comprise a horizontal motion sensor at the bottom of the body of water.

7. The method of claim 1 wherein the detected seismic waves further comprise shear waves reflected from a reflecting interface below said interval and the seismic sensors comprise a horizontal motion sensor.

8. The method of claim 7 wherein the at least one location of the seismic source is in a body of water and the plurality of horizontal motion sensors is at a bottom of the body of water.

9. The method of claim 3 wherein the amplitude of the reflected seismic waves is related to a sensitivity of the shear wave velocity in said interval to an effective pressure therein.

10. The method of claim 8 wherein the detected seismic waves are attenuated and slowed down upon passage through said interval due to a sensitivity of the shear wave velocity in the anomalous interval to an effective pressure there resulting in at least one of (A) a decrease in amplitude, (a) loss of higher frequencies for the detected seismic waves, and (C) increase in traveltime.

11. The method of claim 1 further comprising sending measurements of the characteristic of the detected waves from the plurality of sensors to a processor by at least one of (A) a cable, and, (B) radio telemetry.

12. The method of claim 1 wherein said characteristic is an amplitude of the detected wave and using said characteristic further comprises at least one of (A) evaluating the amplitudes at a plurality of receivers for a single source position, and (B) evaluating the amplitudes from a plurality of source positions.

13. The method of claim 7 wherein said indication is based on at least one of (i) a quality factor of said reflected shear waves, and (ii) a high frequency content of said reflected shear waves.

14. The method of claim 1 wherein the indication is based on at least one of (i) a shear velocity of said interval, and (ii) a shear wave quality factor of said interval.

15. The method of claim 1 wherein the at least one location of the at least one seismic source comprises a plurality of locations on at least one seismic line collinear with positions of some of the plurality of seismic sensors, the method further comprising defining a seismic trace corresponding to each of the plurality of seismic sensors.

16. The method of claim 1 wherein the interval further comprises a shallow water flow sand.

17. The method of claim 15 further comprising gathering the plurality of seismic traces on the at least one seismic line having a predefined relation between said locations of seismic sources and said positions of the seismic sensors to give a plurality of seismic trace gathers.

18. The method of claim 15 wherein the said indication is based on at least one of (i) a shear velocity of said interval, and (ii) a shear wave quality factor of said interval.

19. The method of claim 17 further comprising performing at least one of (i) a prestack inversion of said plurality of seismic trace gathers, and, (ii) a post-stack inversion of said plurality of seismic trace gathers.

20. The method of claim 18 wherein the at least one seismic line further comprises a plurality of seismic lines.

21. A method of obtaining an indication of an abnormal fluid pressure in an interval in the earth, the method comprising:

(a) determining an angle dependent reflection coefficient of elastic waves reflected from at least one of (i) an upper boundary of said interval, and (ii) a lower boundary of said interval; and (b) using a change in the angle dependent reflection coefficient for determining a change in the shear velocity of said interval relative to at least one of (i) an upper overlying interval, and (ii) an underlying interval, said change in shear velocity being indicative of said abnormal pressure.

22. The method of claim 21 wherein the elastic waves are at least one of (A) compressional waves, and, (B) shear waves.

23. The method of claim 21 wherein the interval further comprises a shallow water flow sand.

* * * * *